US012663749B2

(12) United States Patent
Tosuji et al.

(10) Patent No.: US 12,663,749 B2
(45) **Date of Patent: *Jun. 23, 2026**

(54) CARTRIDGE INCLUDING HOLDER THAT FACILITATES RECYCLING OF STORAGE MEDIUM

(71) Applicant: BROTHER KOGYO KABUSHIKI KAISHA, Nagoya (JP)

(72) Inventors: Kenta Tosuji, Nagoya (JP); Nao Itabashi, Nagoya (JP); Kazuya Kamikawa, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,526

(22) Filed: Sep. 19, 2024

(65) Prior Publication Data

US 2025/0013187 A1 Jan. 9, 2025

Related U.S. Application Data

(63) Continuation of application No. 18/333,215, filed on Jun. 12, 2023, now Pat. No. 12,135,522, which is a (Continued)

(30) Foreign Application Priority Data

Sep. 16, 2020 (JP) ................................ 2020-155107

(51) Int. Cl.
*G03G 21/16* (2006.01)
*G03G 15/08* (2006.01)
*G03G 21/18* (2006.01)

(52) U.S. Cl.
CPC ..... *G03G 21/1652* (2013.01); *G03G 15/0863* (2013.01); *G03G 21/1885* (2013.01)

(58) Field of Classification Search
CPC ........... G03G 15/0863; G03G 21/1652; G03G 21/1885
(Continued)

(56) References Cited

U.S. PATENT DOCUMENTS 5,576,820 A 11/1996 Hagihara et al.
10,534,312 B2 * 1/2020 Yokoi ................ G03G 15/0863
(Continued)

FOREIGN PATENT DOCUMENTS

CN 203573089 U 4/2014
CN 104216253 A 12/2014
(Continued)

OTHER PUBLICATIONS

Office Action issued in corresponding Canadian Patent Application No. 3,192,180, Aug. 30, 2024.
(Continued)

*Primary Examiner* — Hoan H Tran
(74) *Attorney, Agent, or Firm* — Merchant & Gould P.C.

(57) ABSTRACT

A cartridge includes: a housing; a storage medium having an electrical contact surface; and a holder movable relative to the housing. The holder includes a first holder member. and a second holder member movable relative to the first holder member. The first holder member includes at least one pawl and holds the electrical contact surface at one end surface of the first holder member in a first direction crossing the electrical contact surface. The second holder member includes at least one corner part engageable with the at least one pawl to provide an engaging portion therebetween. The second holder member has a through-hole that is open at another end face of the second holder member in the first direction. The engaging portion is accessible from an outside of the holder through the through-hole.

16 Claims, 15 Drawing Sheets

Related U.S. Application Data continuation of application No. 17/412,716, filed on Aug. 26, 2021, now Pat. No. 11,720,051.

(58) Field of Classification Search
USPC .......................................... 399/90, 111, 262
See application file for complete search history.

(56) References Cited

U.S. PATENT DOCUMENTS

| | | | | |
|---|---|---|---|---|
| 12,135,522 | B2 * | 11/2024 | Tosuji | G03G 21/1885 |
| 2010/0008693 | A1 | 1/2010 | Hayashi et al. | |
| 2014/0356004 | A1 | 12/2014 | Tsuritani et al. | |
| 2015/0037059 | A1 | 2/2015 | Yang et al. | |
| 2017/0184998 | A1 | 6/2017 | Itabashi | |
| 2017/0185032 | A1 | 6/2017 | Itabashi et al. | |
| 2017/0277119 | A1 | 9/2017 | Sakai et al. | |
| 2018/0314202 | A1 | 11/2018 | Yokoi | |
| 2019/0265641 | A1 | 8/2019 | Yokoi | |
| 2020/0272085 | A1 | 8/2020 | Shinoya et al. | |

FOREIGN PATENT DOCUMENTS

| | | | |
|---|---|---|---|
| CN | 106919026 | A | 7/2017 |
| EP | 3 889 685 | A1 | 10/2021 |
| JP | 2003177650 | * | 6/2003 |
| JP | 2005-250375 | A | 9/2005 |
| JP | 2013-246372 | A | 12/2013 |
| JP | 2017-116826 | A | 6/2017 |
| JP | 2017-116828 | A | 6/2017 |
| WO | 2015/066947 | A1 | 5/2015 |

OTHER PUBLICATIONS

International Search Report and Written Opinion issued in corresponding International Patent Application No. PCT/JP2021/031351, Oct. 26, 2021.
Extended European Search Report issued in corresponding European Patent Application No. 21193148.0, Jan. 14, 2022.
Office Action issued in Japanese patent application 2020-155107, Jun. 4, 2024.

* cited by examiner

CARTRIDGE INCLUDING HOLDER THAT FACILITATES RECYCLING OF STORAGE MEDIUM

REFERENCE TO RELATED APPLICATIONS

This application is a continuation of U.S. patent application Ser. No. 18/333,215, filed Jun. 12, 2023, which is a continuation of U.S. patent application Ser. No. 17/412,716, filed Aug. 26, 2021, now U.S. Pat. No. 11,720,051, which claims priority from Japanese Patent Application No. 2020-155107 filed Sep. 16, 2020. The entire contents of the aforementioned applications are incorporated herein by reference.

BACKGROUND ART

Technical Field

The present disclosure relates to a cartridge.

Background

There has been known an electro-photographic type image-forming apparatus such as a laser printer and an LED printer. A developing cartridge is used in the image-forming apparatus. The developing cartridge includes a developing roller for supplying toner. A conventional developing cartridge includes a holder holding a storage medium.

DESCRIPTION

Summary

For recycling a developing cartridge including a storage medium, information stored in the storage medium is rewritten, or the storage medium is exchanged with a new storage medium. However, according to the above-identified conventional developing cartridge, a cover holding the holder is fixed to a casing of the developing cartridge by screw-fixing. Hence the cover must be detached from the casing each time data rewriting or exchange of the storage medium is performed. Accordingly, workload for recycling is increased.

In view of the foregoing, it is an object of the disclosure to provide a technique for reducing workload incurred for recycling of a cartridge including a holder.

In order to attain the above and other objects, according to one aspect, the disclosure provides a cartridge including a housing, a storage medium, and a holder. The storage medium includes an electrical contact surface. The holder is movable relative to the housing. The holder includes a first holder member and a second holder member. The first holder member holds the electrical contact surface, and includes at least one pawl. The first holder member has one end surface in a first direction crossing the electrical contact surface, and the electrical contact surface is positioned at the one end surface. The second holder member is movable relative to the first holder member. The second holder member includes at least one corner part engageable with the at least one pawl to provide an engaging portion therebetween. The second holder member has one end portion and another end face in the first direction. The second holder member has a through-hole that is open at the another end face. The engaging portion is accessible from an outside of the holder through the through-hole.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Hereinafter, a developing cartridge 1 according to one embodiment of the present disclosure will be described with reference to accompanying drawings.

In the following description, a direction crossing an electrical contact surface 411 (FIG. 2) will be referred to as a "first direction". Further, an extending direction of a rotation axis of a developing roller 20 (FIG. 2) will be referred to as a "second direction". Further, a direction connecting between one end of a casing 10 of the developing cartridge 1 where the developing roller 20 is positioned and another end of the casing 10 opposite the one end of the casing 10 will be referred to as a "third direction". The first direction and the second direction cross each other, and preferably, perpendicular to each other. The second direction and the third direction cross each other, and preferably, perpendicular to each other. The third direction and the first direction cross each other, and preferably, perpendicular to each other.

1. Overall Structure of Developing Cartridge

Figure 1:
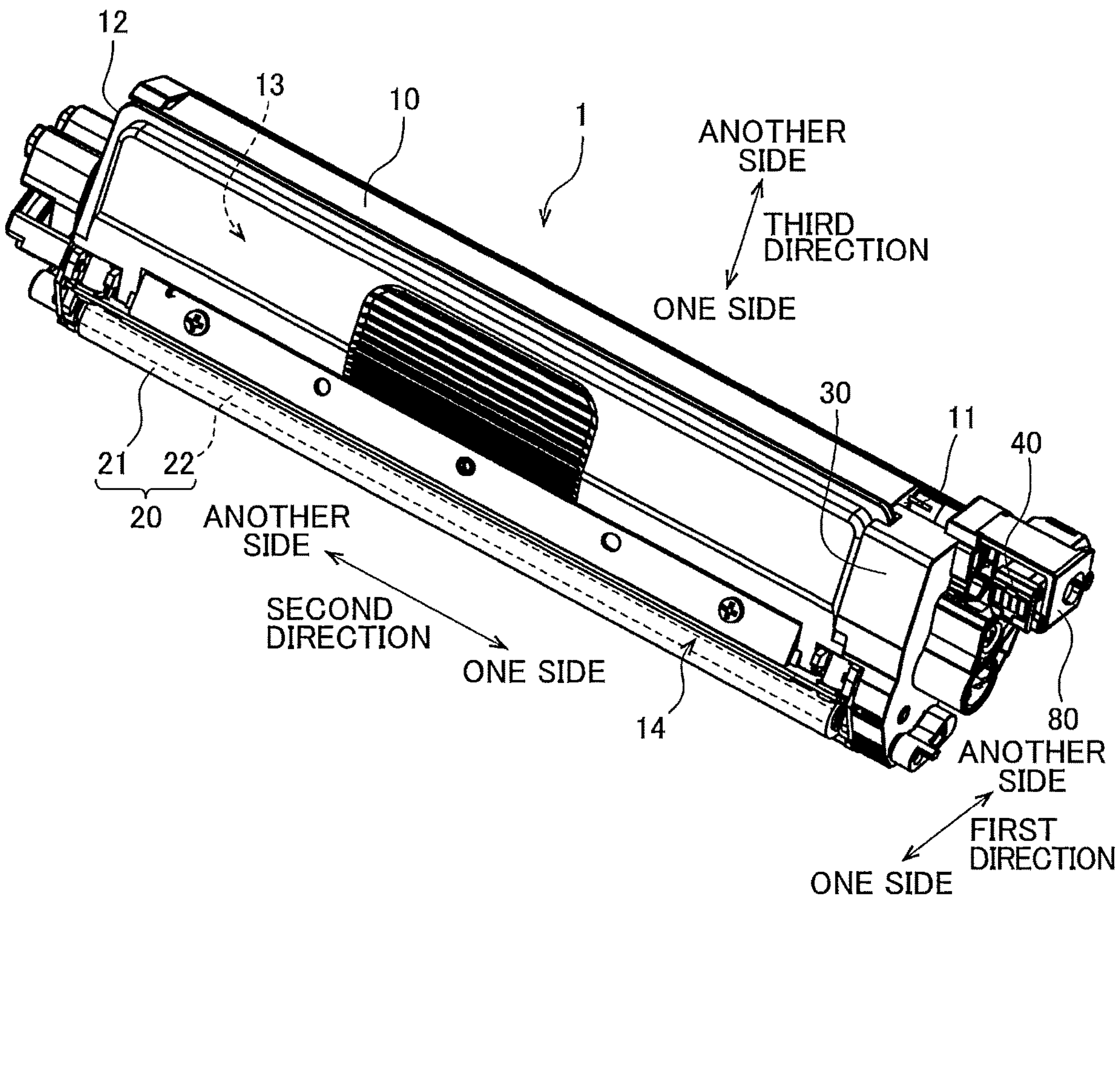
FIG. 1 is a perspective view of a developing cartridge according to one embodiment of the disclosure.
Figure 2:
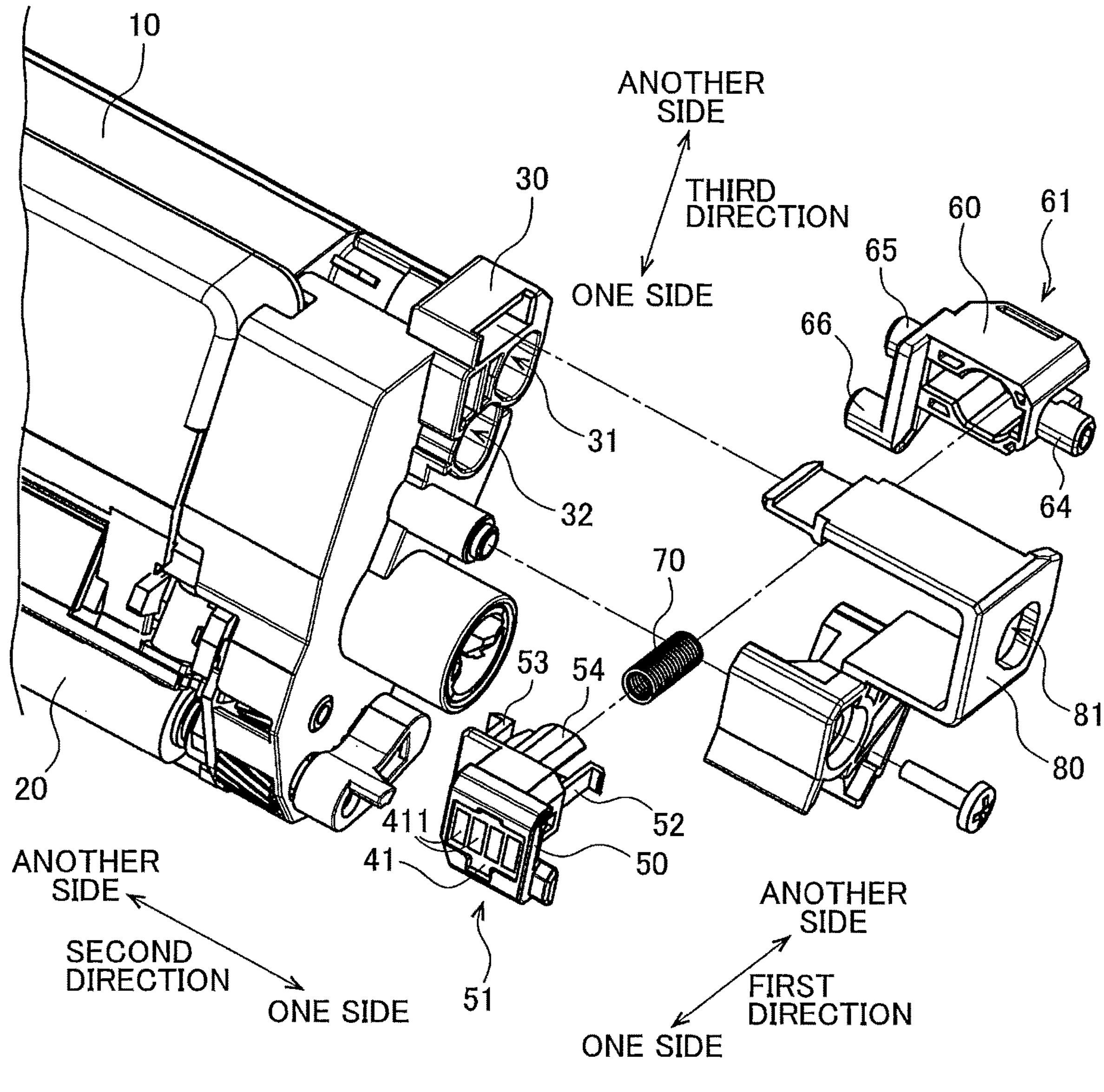
FIG. 2 is a partial exploded perspective view of the developing cartridge according to the embodiment.

FIG. 1 is a perspective view of the developing cartridge 1. FIG. 2 is a partial exploded perspective view of the developing cartridge 1. The developing cartridge 1 is used in an electro-photographic type image-forming apparatus, such as a laser printer and an LED printer.

The developing cartridge 1 is configured to be attached to a drum cartridge. Further, the drum cartridge to which the developing cartridge 1 is attached is configured to be attached to the image-forming apparatus. The developing cartridge 1 is configured to supply developing agent such as toner to a photosensitive drum of the drum cartridge. Incidentally, a single developing cartridge 1 may be attached to the single drum cartridge, or a plurality of developing cartridges 1 may be attached to the single drum cartridge.

As illustrated in FIGS. 1 and 2, the developing cartridge 1 includes the casing 10, the developing roller 20, a gear cover 30, a memory assembly 40, and a holder cover 80.

The casing 10 is configured to accommodate therein developing agent. The casing 10 has a first outer surface 11 and a second outer surface 12 spaced apart from the first outer surface 11 in the second direction. The gear cover 30, the memory assembly 40, and the holder cover 80 are positioned at the first outer surface 11. The casing 10 extends in the second direction between the first outer surface 11 and the second outer surface 12. The casing 10 has an interior functioning as an accommodation chamber 13 for accommodating therein the developing agent.

The developing roller 20 is rotatable about a rotation axis extending in the second direction. The casing 10 has an opening portion 14. The opening portion 14 provides communication between the accommodation chamber 13 and an outside of the casing 10. The opening portion 14 is positioned at one end of the casing 10 in the third direction. The developing roller 20 is positioned at the opening portion 14. That is, the developing roller 20 is positioned at the one end in the third direction of the casing 10.

The developing roller 20 includes a developing roller body 21 and a developing roller shaft 22. The developing roller body 21 is hollow cylindrical and extends in the second direction. The developing roller body 21 is made from elastic material such as rubber. The developing roller shaft 22 is a solid cylindrical and extends throughout a length of the developing roller body 21 in the second direction. The developing roller shaft 22 is made from metal or electrically conductive resin.

Incidentally, the developing roller shaft 22 may not extend throughout the length of the developing roller body 21 in the second direction. For example, the developing roller shaft 22 may extend in the second direction from each end in the second direction of the developing roller body 21.

The developing roller body 21 is fixed to the developing roller shaft 22, so that the developing roller shaft 22 is non-rotatable relative to the developing roller body 21. Further, a developing roller gear (not illustrated) is fixed to one end of the developing roller shaft 22 in the second direction, so that the developing roller gear is non-rotatable relative to the one end of the developing roller shaft 22. Accordingly, rotation of the developing roller gear causes co-rotation of the developing roller shaft 22 and the developing roller body 21.

When driving force is transmitted to the developing cartridge 1, the developing agent in the accommodation chamber 13 of the casing 10 is supplied therefrom to an outer peripheral surface of the developing roller 20 through a supply roller (not illustrated). At this time, the developing agent positioned between the supply roller and the developing roller 20 is subjected to tribo-charging. Further, a bias voltage is applied to the developing roller shaft 22 of the developing roller 20. Hence, the developing agent is attracted to the outer peripheral surface of the developing roller body 21 by electrostatic force imparted between the developing roller shaft 22 and the developing agent.

The developing cartridge 1 further includes a layer thickness regulation blade (not illustrated). The layer thickness regulation blade is configured to regulate a thickness of the layer of the developing agent supplied to the outer peripheral surface of the developing roller body 21 into a uniform thickness. Then, the developing agent carried on the outer peripheral surface of the developing roller body 21 is supplied to the photosensitive drum of the drum cartridge. At this time, the developing agent is moved from the developing roller body 21 to the outer peripheral surface of the photosensitive drum in accordance with an electrostatic latent image formed on the outer peripheral surface of the photosensitive drum. Hence, the electrostatic latent image is developed into a visible image on the outer peripheral surface of the photosensitive drum.

The gear cover 30 is positioned at one end in the second direction of the casing 10. The gear cover 30 is fixed to the first outer surface 11 of the casing 10. The gear cover 30 constitutes a housing of the developing cartridge 1 in combination with the casing 10. A plurality of gears including the above-described developing gear are positioned between the first outer surface 11 of the casing 10 and the gear cover 30.

2. Memory Assembly and Holder Cover

Figure 3:
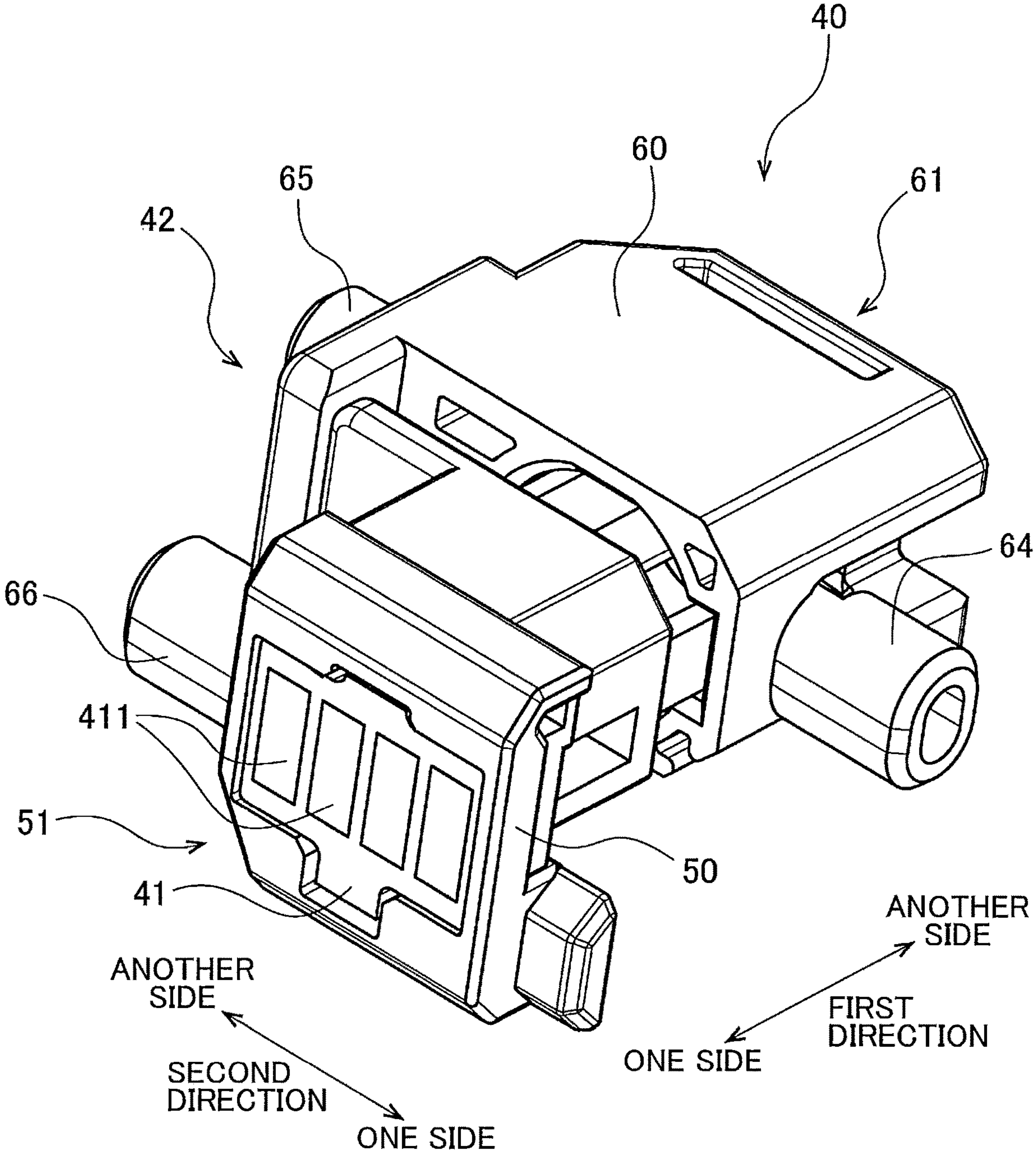
FIG. 3 is a perspective view of a memory assembly in the developing cartridge according to the embodiment.
Figure 4:
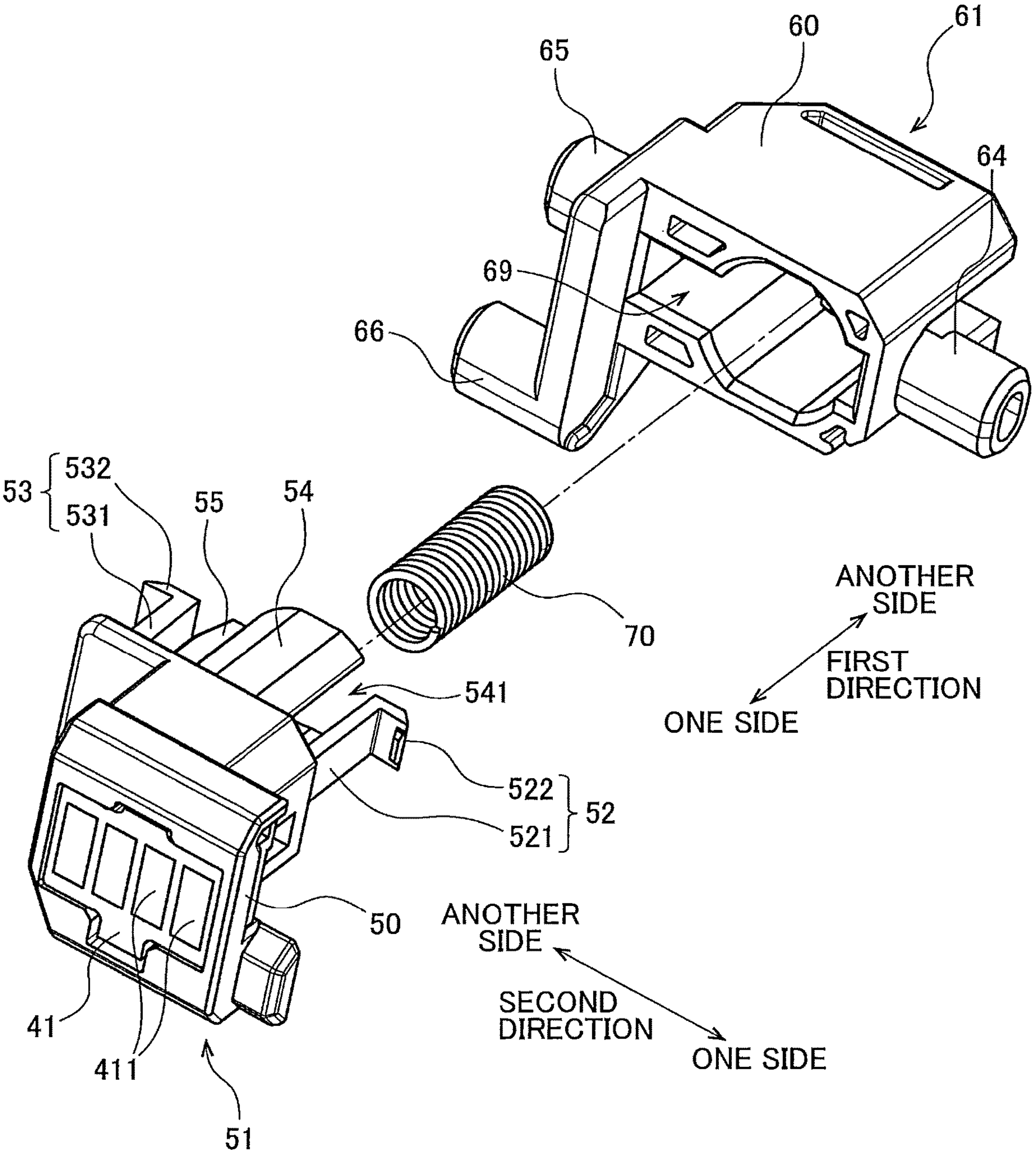
FIG. 4 is an exploded perspective view of the memory assembly of FIG. 3.
Figure 5:
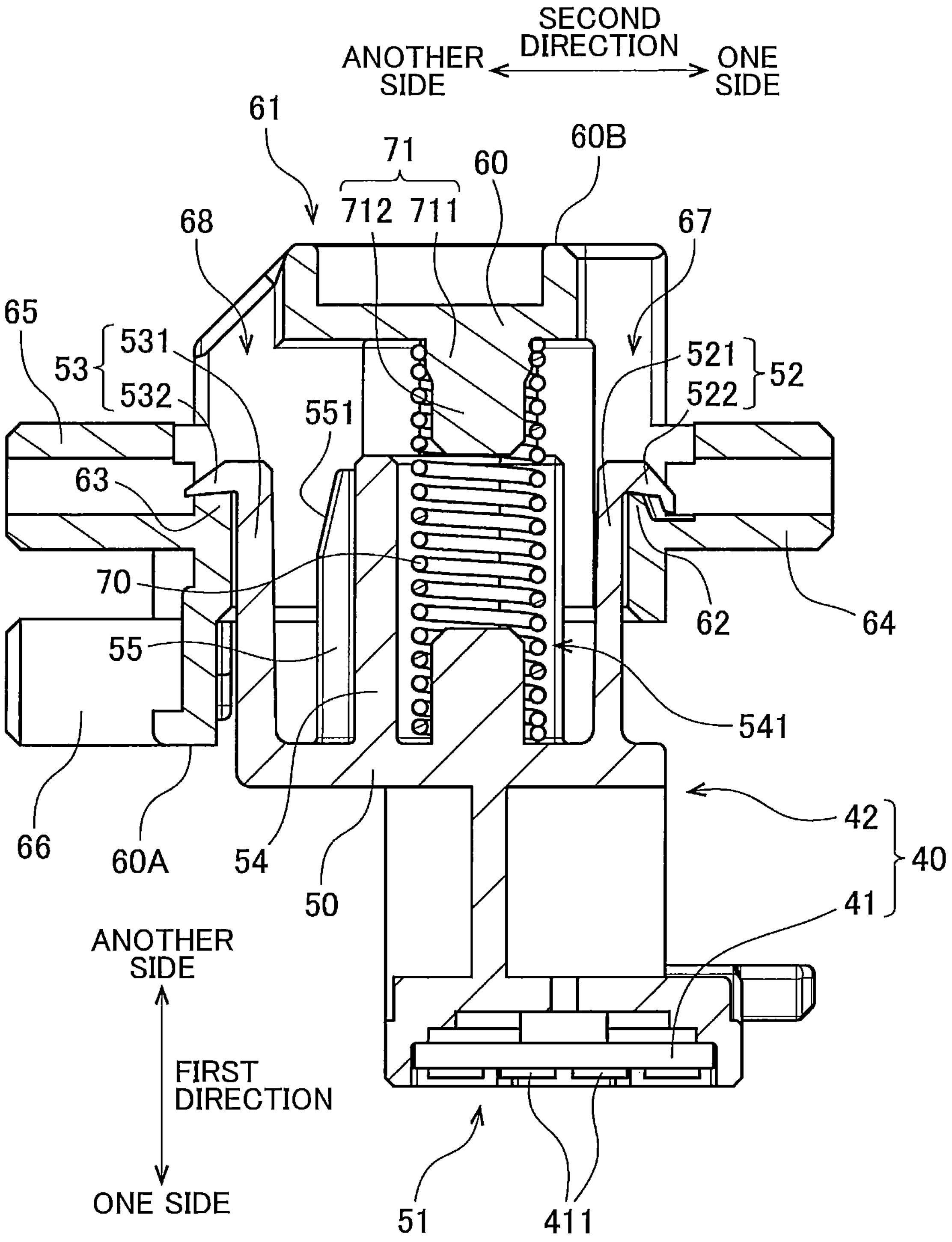
FIG. 5 is a transverse cross-sectional view of the memory assembly and particularly illustrating a first state of a coil spring.
Figure 6:
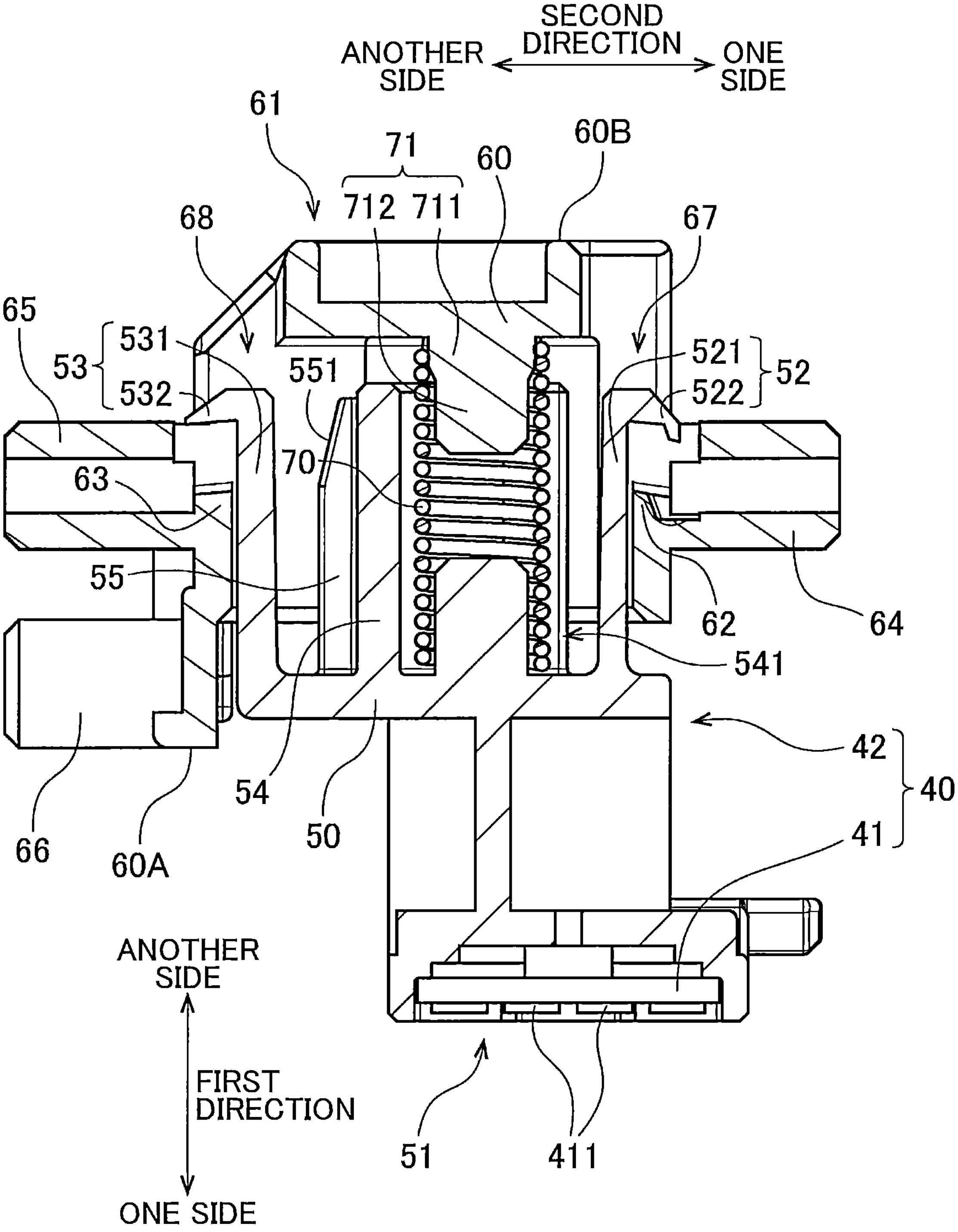
FIG. 6 is a transverse cross-sectional view of the memory assembly and particularly illustrating a second state of the coil spring.
Figure 7:
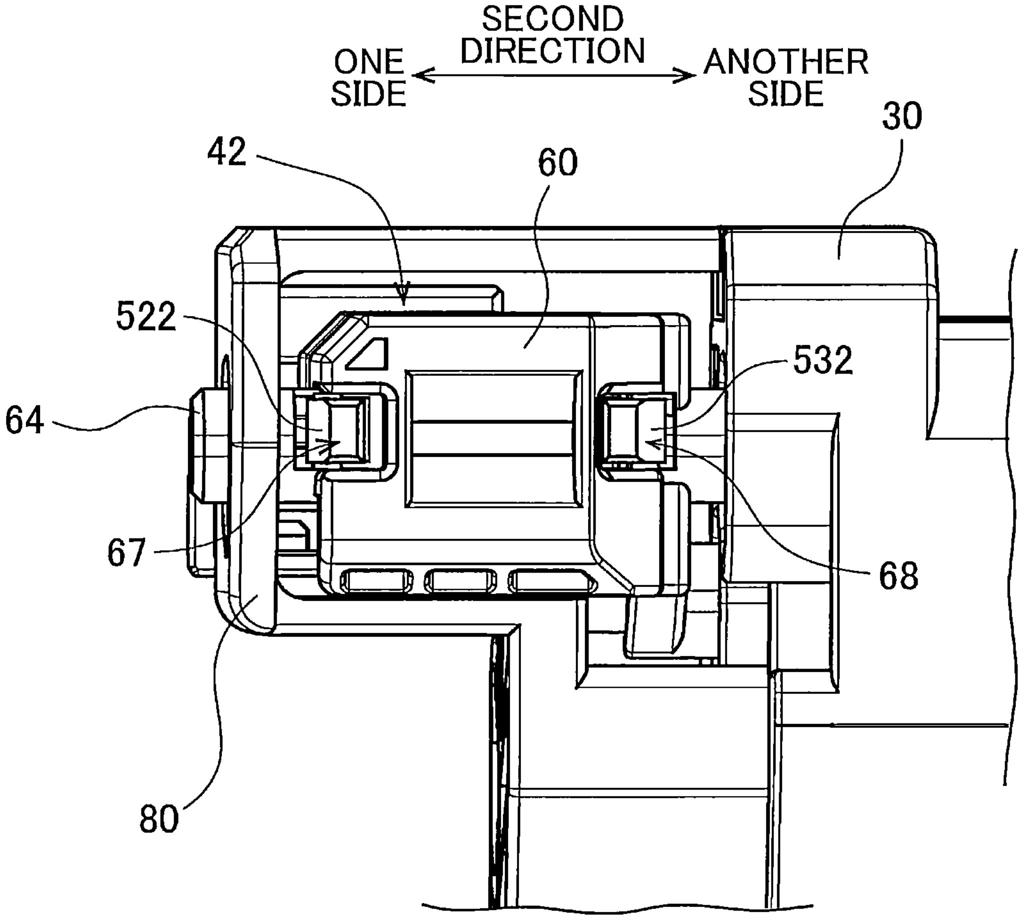
FIG. 7 is a view illustrating a portion around the memory assembly in the developing cartridge as viewed from another side in a first direction.

Next, the memory assembly 40 and the holder cover 80 will be described. FIG. 3 is a perspective view of the memory assembly 40. FIG. 4 is an exploded perspective view of the memory assembly 40. FIGS. 5 and 6 are transverse cross-sectional views of the memory assembly 40. FIG. 7 is a view of the memory assembly 40 and a portion in the vicinity thereof as viewed from another side in the first direction.

The memory assembly 40 is positioned at the one end in the second direction of the casing 10. Specifically, the memory assembly 40 is positioned at an outer surface of the gear cover 30. As illustrated in FIGS. 2 through 6, the memory assembly 40 includes a memory 41, and a holder 42 holding the memory 41. The memory 41 is positioned on an outer surface of the holder 42 at one side in the first direction.

The memory 41 is configured to store therein information about the developing cartridge 1. Specifically, the memory 41 stores at least one of identification information and lifetime information on the developing cartridge 1. The identification information may include at least one of: a manufacturing serial number of the developing cartridge 1; and an identification code as a proof of a genuine product. The lifetime information may include at least one of: a volume of the developing agent; a service life of the developing roller 20; information indicating a new product; a cumulative rotation number of the developing roller 20; a cumulative number of printed sheets; and an error history. Further, the memory 41 may also store information about a model that matches with the developing cartridge 1, in addition to the identification information and the lifetime information.

The memory 41 has four electrical contact surfaces 411. The four electrical contact surfaces 411 are surfaces of electrically conductive metal exposed to the outside. The four electrical contact surfaces 411 are electrically connected to the memory 41. The four electrical contact surfaces 411 are arrayed with each other in the second direction. Incidentally, the number of the electrical contact surfaces 411 may be not more than three, or not less than five.

As illustrated in FIGS. 2 through 6, the holder 42 includes a first end portion 51 and a second end portion 61. The first end portion 51 corresponds to one end portion of the holder 42 in the first direction. The second end portion 61 corresponds to another end portion of the holder 42 in the first direction. The first end portion 51 and the second end portion 61 are spaced apart from each other in the first direction. Further, the first end portion 51 is movable in the first direction relative to the second end portion 61.

Specifically, the holder 42 includes a first holder member 50, a second holder member 60, and a coil spring 70 positioned therebetween. The first holder member 50 is made from, for example, resin. The second holder member 60 is made from, for example, resin. The first holder member 50 is movable in the first direction relative to the second holder member 60. The first holder member 50 includes the first end portion 51. The memory 41 is held to an outer surface of the first end portion 51. The second holder member 60 includes the second end portion 61.

The coil spring 70 is resiliently deformable member extending in the first direction. The coil spring 70 is positioned between the first end portion 51 and the second end portion 61 in the first direction. The coil spring 70 has one end portion in the first direction connected to the first holder member 50. The coil spring 70 has another end portion in the first direction connected to the second holder member 60. Specifically, the second holder member 60 includes a columnar portion 71 as illustrated in FIGS. 5 and 6. The columnar portion 71 protrudes in the first direction toward the first end portion 51 from an inner surface of the second end portion 61. The columnar portion 71 is inserted inside the coil spring 70.

The columnar portion 71 includes a large diameter portion 711 and a small diameter portion 712. The small diameter portion 712 is positioned closer to the first end portion 51 in the first direction than the large diameter portion 711 is to the first end portion 51. Further, the small diameter portion 712 has a diameter smaller than a diameter of the large diameter portion 711. The other end portion in the first direction of the columnar portion 71 is force-fitted with the large diameter portion 711. Hence, the other end portion in the first direction of the columnar portion 71 is fixed to the second holder member 60. Further, the small diameter portion 712 prevents the coil spring 70 from being inclined with respect to the first direction.

The coil spring 70 is configured to expand and compress in the first direction at least between a first state (illustrated in FIG. 5) and a second state (illustrated in FIG. 6). The coil spring 70 has a length in the first direction greater in the first state than in the second state. Hence, a distance between the first end portion 51 and the second end portion 61 in the first direction is greater in the first state than in the second state. Further, the length in the first direction of the coil spring 70 each in the first state and the second state is smaller than a natural length of the coil spring 70.

As illustrated in FIGS. 2 and 4 through 6, the first holder member 50 includes a first pawl 52, and a second pawl 53. The first pawl 52 and the second pawl 53 are arrayed with each other in the second direction.

The first pawl 52 includes a first arm part 521 and a first hook part 522. The first arm part 521 extends in the first direction toward the second end portion 61 from an inner surface of the first holder member 50, the inner surface facing the second end portion 61. The first hook part 522 protrudes from a tip end portion of the first arm part 521 toward the one side in the second direction (away from the gear cover 30).

The second pawl 53 is positioned opposite to the first pawl 52 with respect to the columnar portion 71. The second pawl 53 includes a second arm part 531 and a second hook part 532. The second arm part 531 extends in the first direction toward the second end portion 61 from the inner surface of the first holder member 50, the inner surface facing the second end portion 61. The second hook part 532 protrudes from a tip end portion of the second arm part 531 toward the another side in the second direction (toward the gear cover 30).

On the other hand, as illustrated in FIGS. 5 and 6, the second holder member 60 includes a first corner part 62 and a second corner part 63. The first corner part 62 and the second corner part 63 are positioned inside the second holder member 60. The first corner part 62 is provided by an intersection of a plane extending in the first direction with a plane extending in the second direction. The second corner part 63 is provided by an intersection of a plane extending in the first direction with a plane extending in the second direction. The first corner part 62 is positioned further toward the one side in the second direction than the second corner part 63. The second corner part 63 is positioned opposite to the first corner part 62 with respect to the columnar portion 71.

The first hook part 522 of the first pawl 52 is engageable with the first corner part 62 to provide a first engaging portion therebetween. The second hook part 532 of the second pawl 53 is engageable with the second corner part 63 to provide a second engaging portion therebetween.

The first hook part 522 engages the first corner part 62 in the first state of the coil spring 70. That is, as illustrated in FIG. 5, a surface of the first hook part 522 at the one side in the first direction (the surface facing the memory 41) is in contact with the first corner part 62 in the first state of the coil spring 70. Further, the second hook part 532 engages the second corner part 63 in the first state of the coil spring 70. That is, as illustrated in FIG. 5, a surface of the second hook part 532 at the one side in the first direction (the surface facing the memory 41) is in contact with the second corner part 63 in the first state of the coil spring 70. These engagements can prevent the length in the first direction of the coil spring 70 from being greater than that in the first state. Further, these engagements can prevent disengagement of the first holder member 50 from the second holder member 60.

In contrast, in the second state of the coil spring 70 as illustrated in FIG. 6, the first hook part 522 is separated away from the first corner part 62 toward the another side in the first direction (toward the second end portion 61). Further, in the second state of the coil spring 70 as illustrated in FIG. 6, the second hook part 532 is separated away from the second corner part 63 toward the another side in the first direction (toward the second end portion 61).

The first holder member 50 further includes a sleeve part 54 and a guide rib 55, as illustrated in FIGS. 4 through 6. The sleeve part 54 is hollow cylindrical and extends in the first direction to surround the coil spring 70. As illustrated in FIGS. 4 through 6, the sleeve part 54 has a notch 541. The notch 541 extends in the first direction to penetrate a portion of the sleeve part 54 in the second direction, the portion being at the one side in the second direction.

The guide rib 55 protrudes in the second direction from the sleeve part 54, and extends in the first direction. The second holder member 60 has a key groove 69 extending in the first direction, as illustrated in FIG. 4. The guide rib 55 is inserted in the key groove 69, so that the first holder member 50 is guided in the first direction with respect to the second holder member 60. As illustrated in FIGS. 6 and 7, the guide rib 55 has a tapered surface 551. The tapered surface 551 is at a surface of the guide rib 55, the surface facing the second pawl 53. The tapered surface 551 is provided by diagonally cutting another end portion in the first direction of the guide rib 55.

The holder cover 80 covers at least a portion of the holder 42. The holder cover 80 is fixed to the outer surface of the gear cover 30. Specifically, the holder cover 80 is screw-fixed to the gear cover 30. Hence, the holder cover 80 is movable together with the casing 10 and the gear cover 30. The second holder member 60 is held between the outer surface of the gear cover 30 and the holder cover 80.

Incidentally, the holder cover 80 may be directly screw-fixed to the casing 10, rather than to the gear cover 30. Further, the screw-fixing of the holder cover 80 to the gear cover 30 can be treated as the "screw-fixing of the holder cover 80 to the housing".

As described later, in a configuration where the holder cover 80 is screw-fixed to the casing 10 or the gear cover 30, only the first holder member 50 of the holder 42 can be detached from the holder cover 80 without unfastening screws from the holder cover 80. Since unfastening of the screws is not required for the holder cover 80, detachment of the first holder member 50 from the holder cover 80 can be realized without damaging positioning accuracy of the holder cover 80 relative to the housing. Further, fastening and unfastening of the screws with respect to the holder cover 80 and the casing 10 are required for a fewer number of times than otherwise, contributing to longer service life of the holder cover 80 and the casing 10. Such long-term use of the holder cover 80 and the casing 10 is particularly beneficial for recycling of the developing cartridge 1.

The second holder member 60 includes a first boss 64, a second boss 65, and a third boss 66. The first boss 64 extends in the second direction toward the holder cover 80 from a surface of the second holder member 60, the surface being opposite to a surface facing the gear cover 30. On the other hand, as illustrated in FIG. 2, the holder cover 80 has a cover hole 81. The cover hole 81 penetrates one end portion of the holder cover 80 in the second direction. The first boss 64 is inserted in the cover hole 81.

The second boss 65 and the third boss 66 extend in the second direction toward the gear cover 30 from the surface of the second holder member 60, the surface facing the gear cover 30. That is, the second boss 65 and the third boss 66 are positioned opposite to the first boss 64 with respect to the columnar portion 71. The second boss 65 and the third boss 66 are arrayed with each other in the third direction.

On the other hand, the gear cover 30 has a first recess 31 and a second recess 32. The first recess 31 and the second recess 32 are recessed from the outer surface of the gear cover 30 toward the another side in the second direction (toward the second outer surface 12). The first recess 31 and the second recess 32 are arrayed with each other in the third direction. The second boss 65 is inserted in the first recess 31. The third boss 66 is inserted in the second recess 32.

Incidentally, the first boss 64, the second boss 65, and the third boss 66 may have a solid cylindrical shape or solid prismatic columnar shape.

The cover hole 81 has a dimension (inside dimension) in the third direction greater than a dimension (external size) of the first boss 64 in the third direction. Hence, the first boss 64 is movable in the third direction within the cover hole 81. Further, the first recess 31 has a dimension (inside dimension) in the third direction greater than a dimension (external size) of the second boss 65 in the third direction. Hence, the second boss 65 is movable in the third direction within the first recess 31. Further, the second recess 32 has a dimension (inside dimension) in the third direction greater than a dimension (external size) of the third boss 66 in the third direction. Hence, the third boss 66 is movable in the third direction within the second recess 32.

Accordingly, the second holder member 60 is movable in the third direction, together with the first boss 64, the second boss 65, and the third boss 66, relative to the casing 10, the gear cover 30, and the holder cover 80. The first holder member 50 is caused to move in the third direction together with the second holder member 60 in accordance with the movement of the second holder member 60 in the third direction. Hence, the electrical contact surfaces 411 held by the first holder member 50 are also allowed to move in the third direction in accordance with the movement of the first holder member 50 in the third direction.

Likewise, the cover hole 81 has a dimension (inside dimension) in the first direction greater than a dimension (external size) of the first boss 64 in the first direction. Hence, the first boss 64 is movable in the first direction within the cover hole 81. Further, the first recess 31 has a dimension (inside dimension) in the first direction greater than a dimension (external size) of the second boss 65 in the first direction. Hence, the second boss 65 is movable in the first direction within the first recess 31. Further, the second recess 32 has a dimension (inside dimension) in the first direction greater than a dimension (external size) of the third boss 66 in the first direction. Hence, the third boss 66 is movable in the first direction within the second recess 32.

Accordingly, the second holder member 60 is movable in the first direction along with the first boss 64, the second boss 65, and the third boss 66, relative to the casing 10, the gear cover 30, and the holder cover 80. The first holder member 50 is caused to move in the first direction together with the second holder member 60 in accordance with the movement of the second holder member 60 in the first direction, and hence, the electrical contact surfaces 411 held by the first holder member 50 are allowed to move in the first direction in accordance with the movement of the first holder member 50 in the first direction.

Incidentally, the holder cover 80 may have not less than two cover holes 81. Further, the number of boss to be inserted in the cover hole 81 may be not less than two. Further, the gear cover 30 may have one recess or not less than three recesses. Further, the number of boss to be inserted in the recess of the gear cover 30 may be one or not less than three. Further, the gear cover 30 may have hole(s) instead of the recess(es).

Further, the second holder member 60 may also be movable in the second direction between the gear cover 30 and the holder cover 80.

Figure 8:
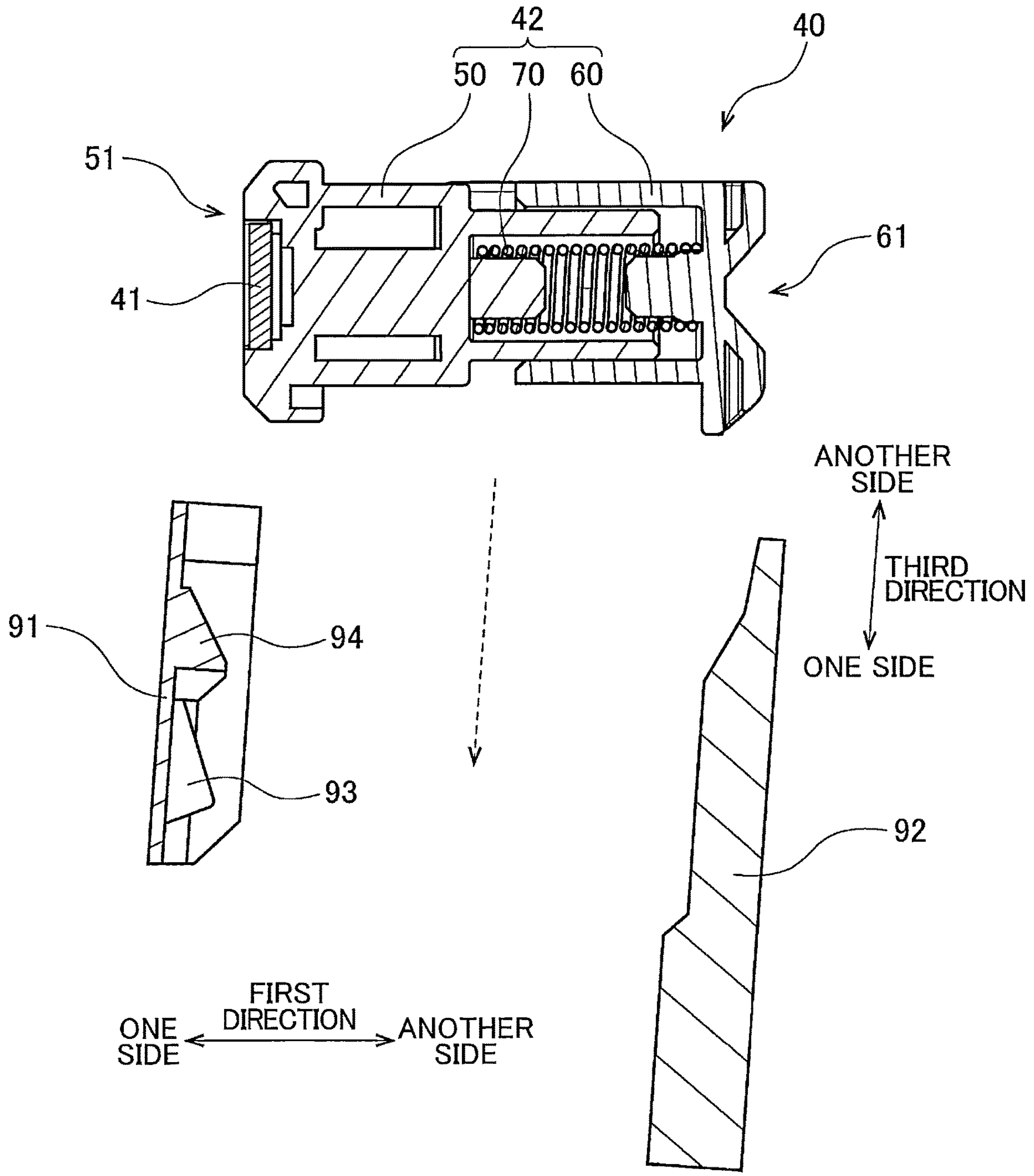
FIG. 8 is a cross-sectional view illustrating a state of the memory assembly for describing attachment of the developing cartridge to a drum cartridge.

FIG. 8 is a cross-sectional view illustrating a state of the memory assembly 40 prior to attachment of the developing cartridge 1 to the drum cartridge. As illustrated in FIG. 8, the drum cartridge includes a first guide plate 91 and a second guide plate 92. The first guide plate 91 and the second guide plate 92 face each other and spaced away from each other in the first direction.

The first guide plate 91 has an electrical connector 93 made from metal and configured to contact the electrical contact surfaces 411 of the memory 41. The electrical connector 93 protrudes toward the second guide plate 92 in the first direction from an outer surface of the first guide plate 91. Further, the first guide plate 91 has a guide protrusion 94 protruding toward the second guide plate 92. The guide protrusion 94 is positioned closer to an insertion opening of the drum cartridge (toward the another side in the third direction) than the electrical connector 93 is to the insertion opening in the third direction.

For attaching the developing cartridge 1 to the drum cartridge, the holder 42 is inserted into the insertion opening defined between the first guide plate 91 and the second guide plate 92. At this time, the first holder member 50 is brought into contact with the first guide plate 91, and the second holder member 60 is brought into contact with the second guide plate 92. Since the holder 42 moves relative to the casing 10, the holder 42 is nipped between the first guide plate 91 and the second guide plate 92.

Then, the first holder member 50 is pushed by the guide protrusion 94 toward the second guide plate 92, so that the length in the first direction of the coil spring 70 is reduced from the first state to the second state. Hence, the distance between the first end portion 51 and the second end portion 61 in the first direction is shortened. After the first holder member 50 moves past the guide protrusion 94, the coil spring 70 again expands to increase its length in the first direction. Hence, the electrical contact surfaces 411 of the memory 41 are brought into contact with the electrical connector 93. That is, the memory 41 and the electrical connector 93 are electrically connected to each other.

As described above, the holder 42 is movable in the first direction and the third direction relative to the casing 10. Further, the holder 42 is capable of expanding and contracting in the first direction. With this structure, the electrical contact surfaces 411 can move along the guide protrusion 94, regardless of a posture of the casing 10 during the insertion of the developing cartridge 1 into the drum cartridge. The electrical contact surfaces 411 are allowed to move in the first direction with respect to the electrical connector 93, thereby restraining frictional wearing of the electrical contact surfaces 411.

Figure 9:
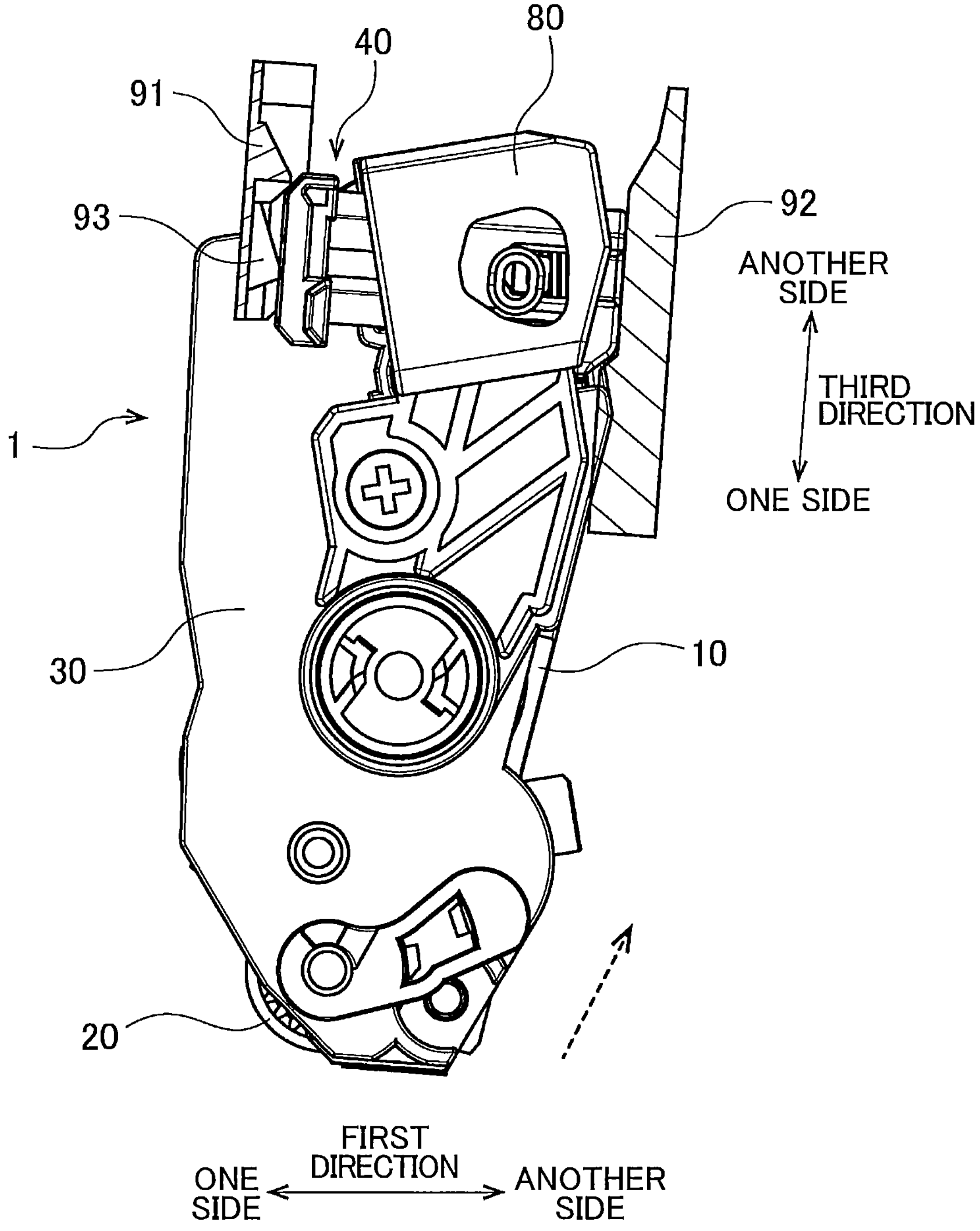
FIG. 9 is a view illustrating a state of the developing cartridge as viewed from one side in a second direction for describing separation of a developing roller of the developing cartridge from a photosensitive drum of the drum cartridge.

Further, the drum cartridge can perform a so-called "separating operation" for temporarily separating the developing roller 20 from the photosensitive drum after the developing cartridge 1 is attached to the drum cartridge. FIG. 9 illustrates a state of the developing cartridge 1 during a separating operation as viewed from the one side in the second direction. As indicated by a broken line arrow in FIG. 9, at the time of the separating operation, the casing 10 of the developing cartridge 1 is caused to move toward the another side in the third direction relative to the drum cartridge due to the driving force from the image-forming apparatus.

In the separating operation, the position of the memory assembly 40 is fixed by the nipping between the electrical connector 93 and the second guide plate 92. Therefore, the position of the memory assembly 40 relative to the drum cartridge can be maintained unchanged in spite of the movement of the casing 10 and the developing roller 20 in the third direction. In this way, the contact between the electrical contact surfaces 411 and the electrical connector 93 can be maintained even at the time of the separating operation, and frictional wearing of the electrical contact surfaces 411 and the electrical connector 93 can be restrained.

3. Structure to Facilitate Recycling

For recycling the developing cartridge 1, information stored in the memory 41 is rewritten, or the memory 41 itself is exchanged with a new memory. To this effect, detachment of the holder cover 80 from the gear cover 30 may increase man-hours. Further, since the holder cover 80 is screw-fixed to the gear cover 30, repeated unfastening and fastening of the screws may cause distortion in screw holes formed in the gear cover 30.

The developing cartridge 1 according to the depicted embodiment has a structure for realizing detachment of the first holder member 50 with the second holder member 60 held between the gear cover 30 and the holder cover 80. Hereinafter this structure will be described in detail.

As illustrated in FIGS. 5 through 7, the second holder member 60 has a first through-hole 67 and a second through-hole 68. Further, the second holder member 60 has one end portion 60A at one side, and another end face 60B at the another side in the first direction. The first through-hole 67 and the second through-hole 68 are positioned at the other end face 60B in the first direction of the second holder member 60. That is, the first through-hole 67 and the second through-hole 68 are positioned in the second end portion 61 of the holder 42. Accordingly, as illustrated in FIG. 7, the first through-hole 67 and the second through-hole 68 are exposed to the outside through the holder cover 80. Further, the first through-hole 67 and the second through-hole 68 are positioned apart from each other in the second direction.

The first through-hole 67 is open at the other end face 60B in the first direction of the second holder member 60, and extends in the first direction. The first through-hole 67 extends in the first direction toward the first hook part 522 throughout the second holder member 60 from the another side in the first direction. Therefore, the first engaging portion where the first hook part 522 of the first pawl 52 engages the first corner part 62 is accessible to an operator through the first through-hole 67 from the outside of the holder 42.

The second through-hole 68 is positioned further toward the another side in the second direction than the first through-hole 67 is. The second through-hole 68 is open at the other end face 60B in the first direction of the second holder member 60, and extends in the first direction. The second through-hole 68 extends in the first direction toward the second hook part 532 throughout the second holder member 60 from the another side in the first direction. Therefore, the second engaging portion where the second hook part 532 of the second pawl 53 engages the second corner part 63 is accessible to the operator through the second through-hole 68 from the outside of the holder 42.

For recycling the developing cartridge 1, an operator inserts a tool (such as a screwdriver or a pair of tweezers) into the first through-hole 67 from the another side of the second holder member 60 in the first direction while the second holder member 60 remains held between the gear cover 30 and the holder cover 80. Then, the operator uses a tip end of the tool to push the first hook part 522 in a direction away from the first corner part 62. The operator thus realizes disengagement of the first hook part 522 from the first corner part 62.

Further, the operator inserts the tool (such as a screwdriver or a pair of tweezers) into the second through-hole 68 from the another side of the second holder member 60 in the first direction while the second holder member 60 remains held between the gear cover 30 and the holder cover 80. The operator then uses the tip end of the tool to push the second hook part 532 in a direction away from the second corner part 63. The operator thus realize disengagement of the second hook part 532 from the second corner part 63.

After the first pawl 52 and the second pawl 53 are disengaged respectively from the first corner part 62 and the second corner part 63, the operator pulls out the first pawl 52 and the second pawl 53 from the second holder member 60 in the first direction toward the one side. In this way, the operator can remove the first holder member 50 from the second holder member 60 while the second holder member 60 remains held between the gear cover 30 and the holder cover 80.

The operator then rewrites information stored in the memory 41 held by the removed first holder member 50, or the operator replaces the memory 41 for a new memory. Thereafter, the operator inserts the first pawl 52 and the second pawl 53 of the first holder member 50 into the second holder member 60. The operator then engages the first hook part 522 of the first pawl 52 and the second hook part 532 of the second pawl 53 with the first corner part 62 and the second corner part 63, respectively.

As described above, in the developing cartridge 1 according to the present embodiment, the second holder member 60 has the first through-hole 67 through which the first pawl 52 of the first holder member 50 is accessible from the outside. The operator can thus push the first pawl 52 through the first through-hole 67 to realize disengagement of the first pawl 52 from the first corner part 62. Further, the second holder member 60 has the second through-hole 68 through which the second pawl 53 of the first holder member 50 is accessible from the outside. The operator can press the second pawl 53 through the second through-hole 68 to realize disengagement of the second pawl 53 from the second corner part 63. In this way, the first holder member 50 can be detached from the second holder member 60 with the second holder member 60 held between the gear cover 30 and the holder cover 80.

As such, detachment of the holder cover 80 from the gear cover 30 is unnecessary for recycling the developing cartridge 1. Therefore, the number of processes incurred for recycling can be reduced. Further, since repeated unfastening and fastening of the screws need not be performed, deformation of the screw holes does not occur in the gear cover 30.

Further, the first through-hole 67 and the second through-hole 68 are both open at the other end face 60B of the second holder member 60 in the first direction. Hence, the first engaging portion (where the first hook part 522 of the first pawl 52 engages the first corner part 62) and the second engaging portion (where the second hook part 532 of the second pawl 53 engages the second corner part 63) are both accessible to the operator from the outside of the second holder member 60 in the first direction from the same side (i.e., from the another side in the first direction).

Further, according to the present embodiment, the first hook part 522 of the first pawl 52 and the second hook part 532 of the second pawl 53 protrude in opposite directions from each other. However, the first hook part 522 and the second hook part 532 are both accessible to the operator in the same direction through the first through-hole 67 and the second through-hole 68.

Further, as described above with reference to FIGS. 4 through 7, the sleeve part 54 has the notch 541 extending throughout a thickness of a portion of the sleeve part 54 in the second direction, the portion facing first pawl 52. For disengaging the first pawl 52 from the first corner part 62, the first pawl 52 is deformed toward the another side in the second direction (toward the gear cover 30). At this time, a part of the first pawl 52 can be inserted in the notch 541. In other words, the notch 541 of the sleeve part 54 can provide a space for allowing deformation of the first pawl 52 without increasing a size of the holder 42.

Further, as described above with reference to FIGS. 6 and 7, the guide rib 55 has the tapered surface 551. For disengaging the second pawl 53 from the second corner part 63, the second pawl 53 is deformed toward the one side in the second direction (toward the holder cover 80). At this time, a part of the second pawl 53 can be positioned in a space provided by the tapered surface 551. In this way, the tapered surface 551 of the guide rib 55 can provide the space required for the deformation of the second pawl 53 without increasing the size of the holder 42.

4. Method for Detaching the First Holder Member

Next, a method for detaching the first holder member 50 from the second holder member 60 in the developing cartridge 1 will be described in further details.

Figure 10:
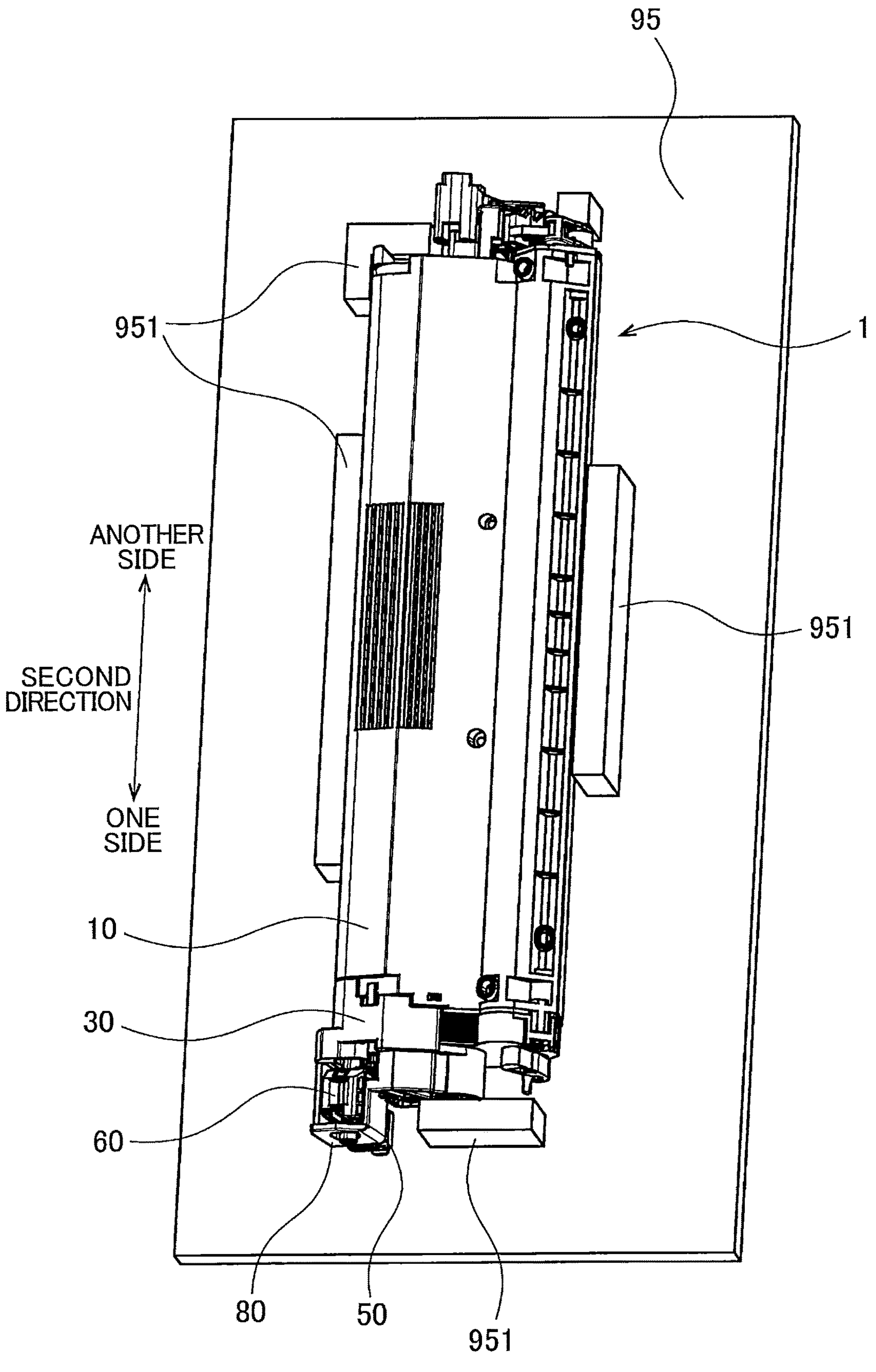
FIG. 10 is a perspective view of the developing cartridge for description of detachment of a first holder member from a second holder member.
Figure 11:
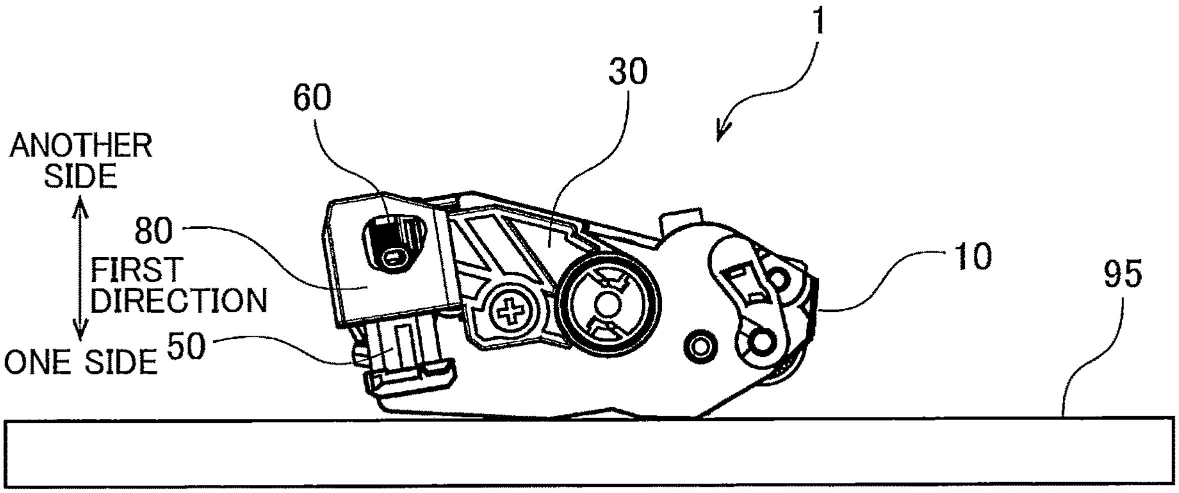
FIG. 11 is a view illustrating a state of the developing cartridge as viewed from the one side in the second direction for describing detachment of the first holder member from the second holder member, and particularly illustrating an initial state of the developing cartridge.
Figure 12:
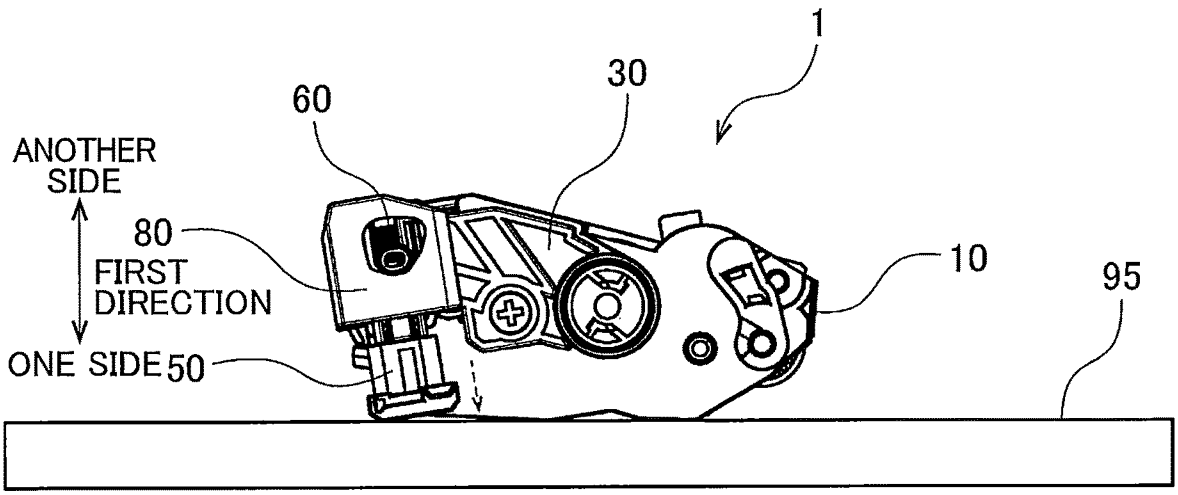
FIG. 12 is a view illustrating the state of developing cartridge as viewed from the one side in the second direction for describing detachment of the first holder member from the second holder member, and particularly illustrating a state after the state illustrated in FIG. 11.
Figure 13:
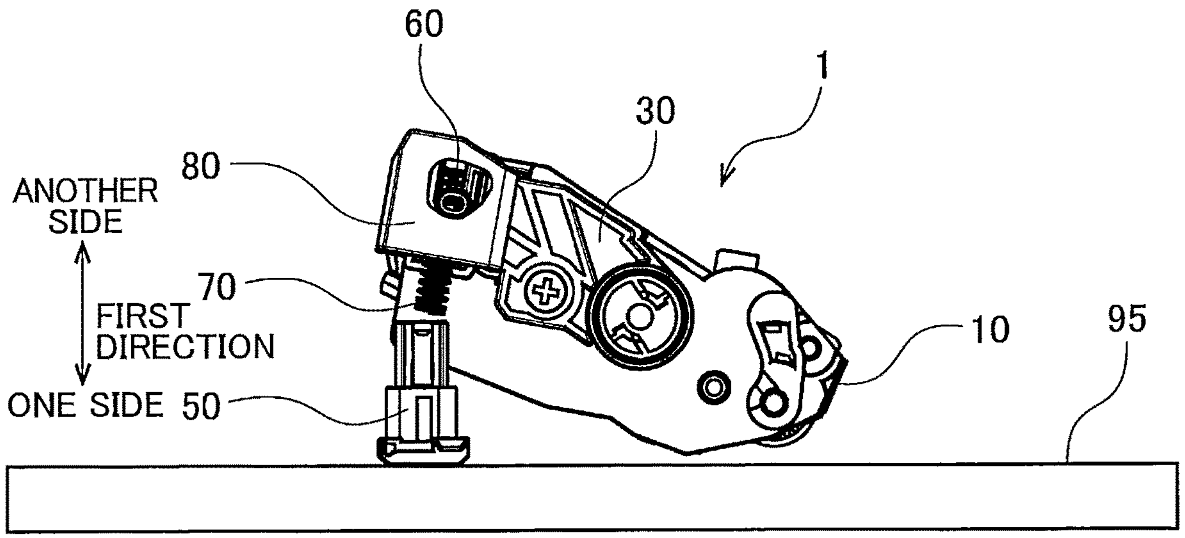
FIG. 13 is a view illustrating the state of developing cartridge as viewed from the one side in the second direction for describing detachment of the first holder member from the second holder member, and particularly illustrating a state after the state illustrated in FIG. 12.

FIG. 10 is a perspective view for description of detachment of the first holder member 50 from the second holder member 60 in the developing cartridge 1. FIGS. 11 through 13 are views for description of the detachment of the first holder member 50 from the second holder member 60 as viewed from the one side in the second direction. As illustrated in FIGS. 10 through 13, a first jig 95 is used for the detachment of the first holder member 50 from the second holder member 60. The first jig 95 has a generally flat plate-like shape.

For detaching the first holder member 50 from the second holder member 60, firstly, the operator sets the developing cartridge 1 on a surface of the first jig 95, such that one end surface in the first direction of the casing 10 faces the surface of the first jig 95 as illustrated in FIGS. 10 and 11. Hence, the electrical contact surfaces 411 of the memory 41 face the surface of the first jig 95.

The surface of the first jig 95 has a plurality of first protrusions 951. The first protrusions 951 protrude toward the another side in the first direction from the surface of the first jig 95. When placed on the surface of the first jig 95, portions of the casing 10 of the developing cartridge 1 are in contact with the respective first protrusions 951. Hence, the casing 10 is fixed in position relative to the first jig 95 in the directions crossing the first direction.

In this state, the operator inserts the tool (such as the screw driver and the tweezers) into the first through-hole 67 from the another side in the first direction. The operator then pushes the first hook part 522 in the direction away from the first corner part 62 with the tip end of the tool to disengage the first hook part 522 from the first corner part 62. Further, the operator inserts the tool (such as the screw driver and the tweezers) into the second through-hole 68 from the another side in the first direction, and pushes the second hook part 532 in the direction away from the second corner part 63 with the tip end of the tool. The second hook part 532 is thus disengaged from the second corner part 63.

At this time, the first hook part 522 is urged by the tool toward the another side in the second direction. The second hook part 532 is urged by the tool toward the one side in the second direction. Here, the tweezers may be used to pinch the first hook part 522 and the second hook part 532 such that the first hook part 522 and the second hook part 532 are urged to approach each other by the respective tip ends of the tweezers. Hence, the operator can simultaneously realize disengagement of the first hook part 522 and the second hook part 532 from the first corner part 62 and the second corner part 63, respectively.

As a result of the disengagement of the first pawl 52 and the second pawl 53 from the first corner part 62 and the second corner part 63, the first holder member 50 is urged to move toward the one side in the first direction because of the resilient urging force of the coil spring 70, as illustrated in FIG. 12. Here, since the first end portion 51 of the first holder member 50 faces the surface of the first jig 95 in the first direction, the first holder member 50 moving toward the first jig 95 comes into contact with the surface of the first jig 95. Thus, popping out of the first holder member 50 can be prevented.

Thereafter, as illustrated in FIG. 13, the operator moves the assembly of the casing 10, the gear cover 30, the holder cover 80, and the second holder member 60 in a direction away from the surface of the first jig 95, i.e., toward the another side in the first direction. Hence, the assembly of the casing 10, the gear cover 30, the holder cover 80, and the second holder member 60 is separated away from the first holder member 50 toward the another side in the first direction. In this way, only the first holder member 50 holding the memory 41 can be detached from the developing cartridge 1 while the second holder member 60 is kept held between the gear cover 30 and the holder cover 80.

Here, the other end portion in the first direction of the coil spring 70 is fixed to the large diameter portion 711 of the columnar portion 71 of the second holder member 60. The other end portion in the first direction of the coil spring 70 remains fixed to the large diameter portion 711 when the first holder member 50 is removed from the second holder member 60. Therefore, the coil spring 70 is also separated together with the second holder member 60 toward the another side in the first direction. Accordingly, detachment of the coil spring 70 can be prevented.

5. Method for Attaching the First Holder Member

Next, a method for attaching the first holder member 50 to the second holder member 60 in the developing cartridge 1 will be described in more detail.

Figure 14:
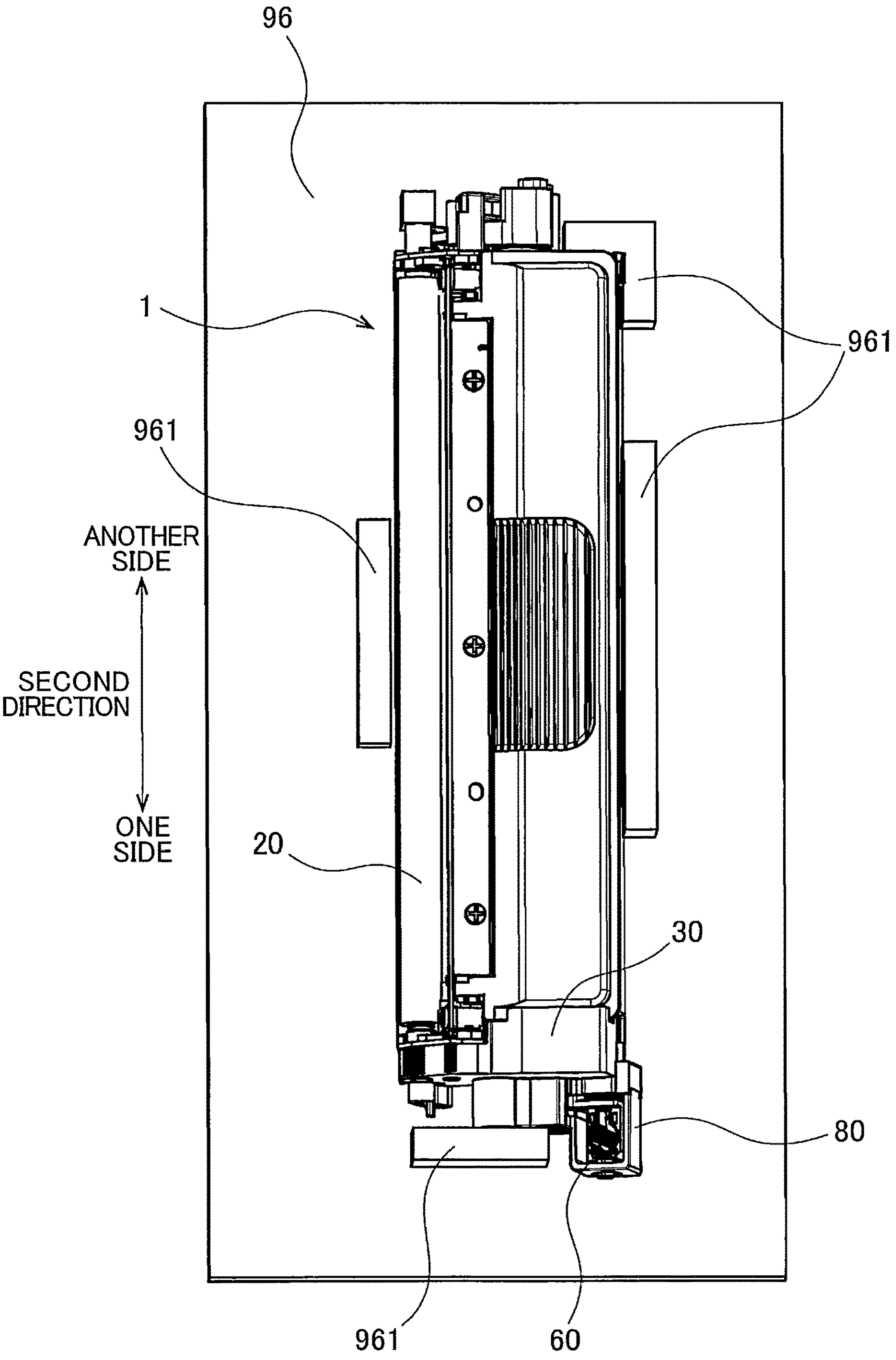
FIG. 14 is a perspective view of the developing cartridge for description of attachment of the first holder member to the second holder member.
Figure 15:
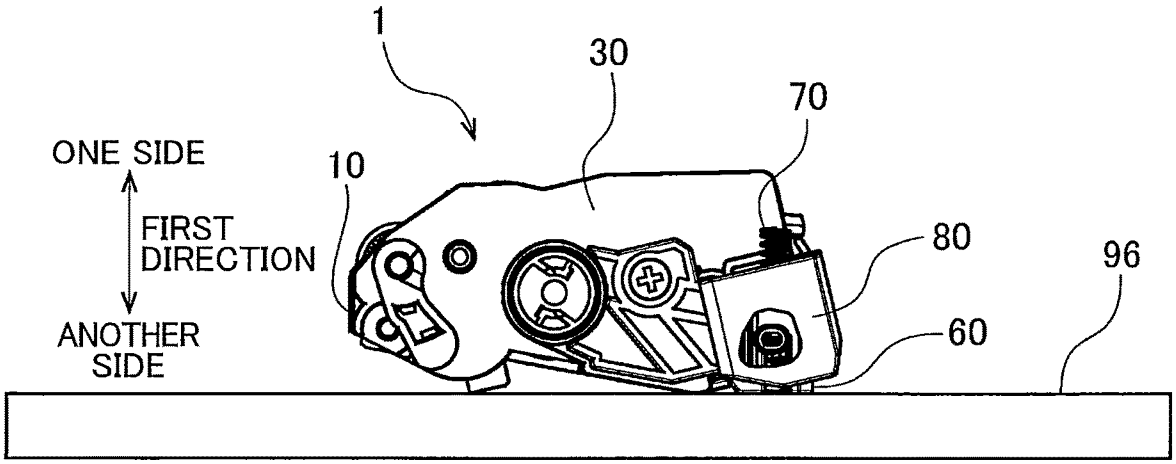
FIG. 15 is a view illustrating the state of developing cartridge as viewed from the one side in the second direction for describing attachment of the first holder member to the second holder member, and particularly illustrating an initial state of the developing cartridge.
Figure 16:
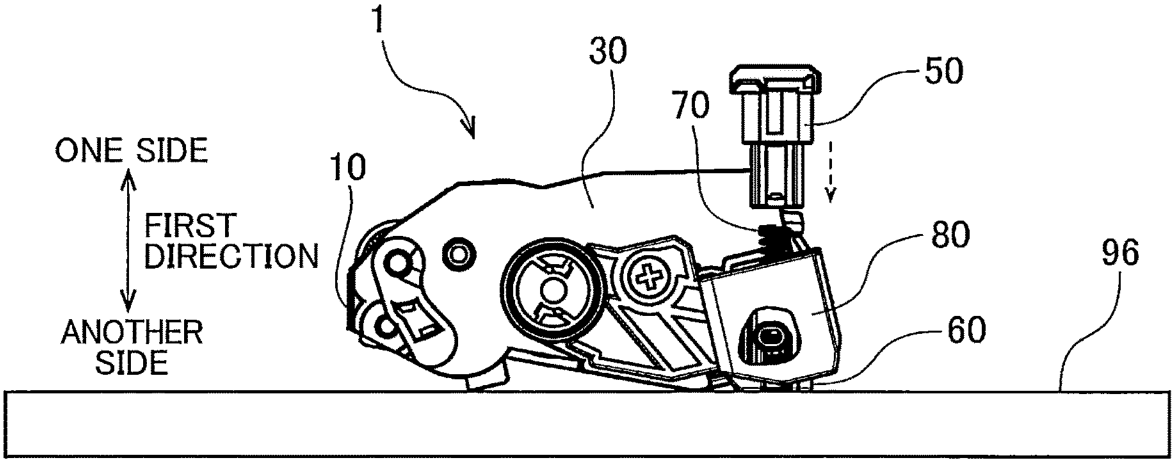
FIG. 16 is a view illustrating the state of developing cartridge as viewed from the one side in the second direction for describing attachment of the first holder member to the second holder member, and particularly illustrating a state after the state illustrated in FIG. 15.
Figure 17:
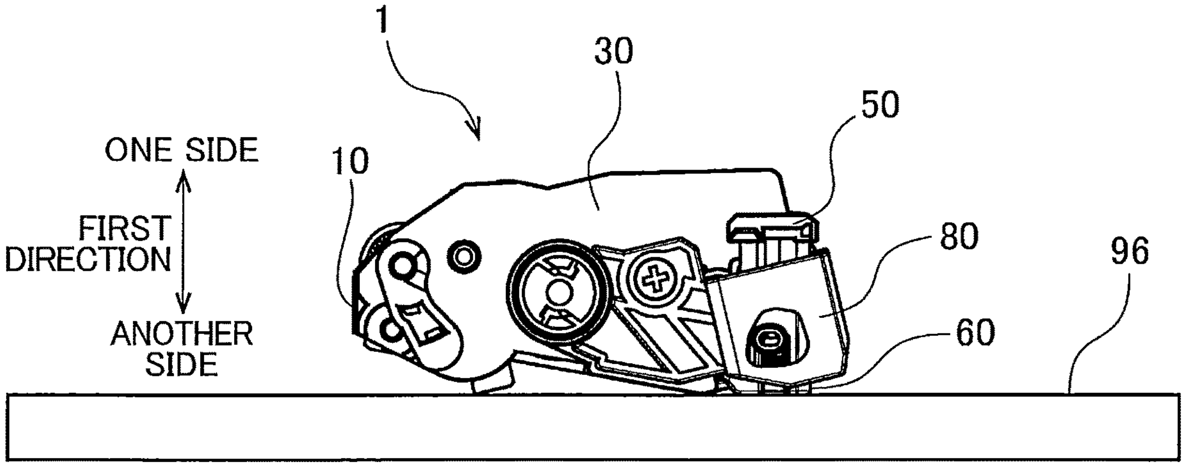
FIG. 17 is a view illustrating the state of developing cartridge as viewed from the one side in the second direction for describing attachment of the first holder member to the second holder member, and particularly illustrating a state after the state illustrated in FIG. 16.

FIG. 14 is a perspective view illustrating a state of the developing cartridge 1 for description of attachment of the first holder member 50 to the second holder member 60. FIGS. 15 through 17 are views illustrating the state of the developing cartridge 1 as viewed from the one side in the second direction for description of the attachment of the first holder member 50 to the second holder member 60. As illustrated in FIGS. 14 through 17, a second jig 96 is used for the attachment. The second jig 96 has a generally flat plate-like shape.

For attaching the first holder member 50 to the second holder member 60, firstly, the operator sets the assembly of the casing 10, gear cover 30, holder cover 80, and the second holder member 60 on the surface of the second jig 96 such that the surface of the casing 10 on the another side in the first direction faces the surface of the second jig 96, as illustrated in FIGS. 14 and 15. Hence, the other end face 60B of the second holder member 60 at the another side in the first direction faces the surface of the second jig 96.

At this time, the other end face 60B of the second holder member 60 extends perpendicular to the first direction. The other end face 60B of the second holder member 60 is brought into contact with the surface of the second jig 96, thereby setting the second holder member 60 on the surface of the second jig 96. Accordingly, the second holder member 60 is set perpendicular to the surface of the second jig 96. That is, the first direction becomes perpendicular to the surface of the second jig 96.

The surface of the second jig 96 has a plurality of second protrusions 961. The second protrusions 961 protrudes from the surface of the second jig 96 toward the one side in the first direction. Portions of the casing 10 positioned on the surface of the second jig 96 are in contact with the second protrusions 961. The casing 10 is thus fixed in position relative to the second jig 96 in the direction crossing the first direction.

The coil spring 70 is attached to the second holder member 60. Specifically, the other end portion in the first direction of the coil spring 70 is fixed to the large diameter portion 711 of the columnar portion 71. Further, as illustrated in FIG. 15, the one end portion in the first direction of the coil spring 70 protrudes out from the second holder member 60 and the holder cover 80 toward the one side in the first direction.

With this state, the operator moves the first holder member 50 toward the second holder member 60 from one side thereof in the first direction, as illustrated in FIG. 16. Specifically, the operator moves the first holder member 50 toward the coil spring 70 protruding out of the second holder member 60, as a target, in the first direction toward the another side. Then, the operator inserts the first pawl 52 and the second pawl 53 of the first holder member 50 into the second holder member 60.

In response to the insertion into the second holder member 60, the first arm part 521 of the first pawl 52 is deformed toward the another side in the second direction, and the second arm part 531 of the second pawl 53 is deformed toward the one side in the second direction. As the operator pushes the first holder member 50 further toward the another side in the first direction, the first hook part 522 and second hook part 532 move past the first corner part 62 and second corner part 63, respectively. Accordingly, the deformed first arm part 521 restores its original shape to cause engagement of the first hook part 522 with the first corner part 62, and the deformed second arm part 531 restores its original shape to cause engagement of the second hook part 532 with the second corner part 63. Attachment of the first holder member 50 to the second holder member 60 is thus completed, as illustrated in FIG. 17.

As described above, according to the depicted embodiment, the operator moves the first holder member 50 such that the first holder member 50 approaches the second holder member 60 in a state where the casing 10 and the second holder member 60 are kept immobile. Hence, the first holder member 50 holding the memory 41 can be readily attached to the second holder member 60.

Further, the operator is required to do nothing other than bringing the first holder member 50 closer to the second holder member 60 to engage the first hook part 522 with the first corner part 62 by making use of the deformation of the first arm part 521. That is, the operator can realize engagement of the first hook part 522 with the first corner part 62 without employment of a tool. Likewise, the operator is required to do nothing other than bringing the first holder member 50 closer to the second holder member 60 to engage the second hook part 532 with the second corner part 63 by making use of the deformation of the second arm part 531. Therefore, the operator can realize engagement of the second hook part 532 with the second corner part 63 without employment of a tool.

In particular, the second holder member 60 is supported vertically with respect to the surface of the second jig 96. This means that the direction in which the first holder member 50 is pushed against the second holder member 60 is perpendicular to the surface of the second jig 96. This configuration can facilitate the operator's pushing of the first holder member 50 into the second holder member 60.

6. Modifications

Various modifications are conceivable.

According to the above-described embodiment, the first holder member 50 includes the first pawl 52 and the second pawl 53. However, the first holder member may have one pawl or not less than three pawls. That is, the first holder member has only to have at least one pawl. Further, the second holder member has only to have at least one corner part engageable with the at least one pawl of the first holder member. Further, the second holder member has only to have at least one through-hole through which the engaging portion between the pawl and the corner part is accessible.

Further, according to the above-described embodiment, the memory 41 having the electrical contact surfaces 411 is fixed to the outer surface of the first end portion 51 of the holder 42. However, only the electrical contact surface configured to contact the electrical connector of the drum cartridge may be fixed to the outer surface of the holder, and a portion of the memory other than the electrical contact surface may be arranged at a position of the developing cartridge different from the position of the electrical contact surface.

Further, the developing cartridge 1 according to the above-described embodiment is configured to be attached to the drum cartridge. However, the developing cartridge 1 may be of a type directly attachable to the image-forming apparatus without intervention of the drum cartridge. In the latter case, the image-forming apparatus may include the first guide plate 91 and the second guide plate 92.

Further, the memory assembly just like the above-described memory assembly 40 may be provided in a cartridge other than the developing cartridge.

Further, shapes of detailed parts of the cartridge according to the disclosure may be different from those illustrated in the attached drawings. Further, parts and components appearing in the described embodiment and modifications thereof may be suitably selected and/or combined as long as no confliction is developed.

While the description has been made in detail with reference to the specific embodiment thereof, it would be apparent to those skilled in the art that many modifications and variations may be made thereto without departing from the scope of the disclosure.

Remarks

The developing cartridge 1 is an example of a cartridge. The casing 10 and gear cover 30 are an example of a housing. The memory 41 is an example of a storage medium. The electrical contact surfaces 411 are an example of an electrical contact surface. The holder 42 is an example of a holder. The first holder member 50 is an example of a first holder member. The second holder member 60 is an example of a second holder member. The first pawl 52 and second pawl 53 are an example of at least one pawl of the first holder member. The first corner part 62 and second corner part 63 are an example of at least one corner part of the second holder member. The one end portion 60A is an example of one end portion in the first direction of the second holder member. The other end face 60B is an example of another end face in the first direction of the second holder member. The first through-hole 67 and second through-hole 68 are an example of a through-hole of the second holder member. The first arm part 521 is an example of a first arm part of the first pawl, and the first hook part 522 is an example of a first hook part of the first pawl. The second arm part 531 is an example of a second arm part of the second pawl, and the second hook part 532 is an example of a second hook part of the second pawl. The coil spring 70 is an example of a resilient urging member. The columnar portion 71 is an example of a columnar portion of the second holder member. The large diameter portion 711 is an example of a large diameter portion of the columnar portion. The small diameter portion 712 is an example of a small diameter portion of the columnar portion. The holder cover 80 is an example of a holder cover.

What is claimed is:

1. A holder for use with a cartridge, the holder comprising:

a first holder member for use with a storage medium, the first holder member including at least one pawl; and a second holder member movable relative to the first holder member in a first direction, the second holder member including at least one corner part engageable with the at least one pawl to provide an engaging portion therebetween, the second holder member having one end portion and another end face in the first direction, the second holder member having a through-hole that is open at the another end face, the through-hole extending throughout the second holder member in the first direction toward the engaging portion.

2. The holder according to claim 1, wherein the at least one pawl is configured to be disengaged from the at least one corner part from the outside of the holder through the through-hole.

3. The holder according to claim 1, wherein the at least one pawl is configured to be disengaged from the at least one corner part from the outside of the holder through the through-hole to realize detachment of the first holder member from the second holder member.

4. The holder according to claim 1, wherein the at least one pawl includes a first pawl and a second pawl, wherein the at least one corner part includes: a first corner part engageable with the first pawl to provide a first engaging portion therebetween; and a second corner part engageable with the second pawl to provide a second engaging portion therebetween, and wherein the through-hole includes: a first through-hole through which the first engaging portion is accessible from the outside of the holder; and a second through-hole through which the second engaging portion is accessible from the outside of the holder.

5. The holder according to claim 4, wherein the first pawl includes:

a first arm part extending in the first direction; and a first hook part protruding from a tip end portion of the first arm part in a second direction crossing the first direction, the first hook part being engageable with the first corner part, and wherein the second pawl includes:

a second arm part extending in the first direction; and a second hook part protruding from a tip end portion of the second arm part in the second direction, the second hook part being engageable with the second corner part.

6. The holder according to claim 5, wherein the first through-hole extends throughout the second holder member in the first direction toward the first hook part, and wherein the second through-hole extends throughout the second holder member in the first direction toward the second hook part.

7. The holder according to claim 5, wherein the first hook part protrudes toward one side in the second direction, and wherein the second hook part protrudes toward another side in the second direction.

8. The holder according to claim 1, further comprising a resilient urging member positioned between the first holder member and the second holder member, the resilient urging member being configured to expand and compress in the first direction.

9. The holder according to claim 8, wherein the resilient urging member is configured to expand and compress in the first direction to provide a first state and a second state, the resilient urging member at the second state being more compressed in the first direction than at the first state, and wherein the at least one pawl engages the at least one corner part in the first state of the resilient urging member.

10. The holder according to claim 8, wherein the resilient urging member is a spring.

11. The holder according to claim 10, wherein the spring is a coil spring having one end portion and another end portion in the first direction, and wherein the second holder member further includes a columnar portion inserted in the another end portion of the coil spring to fix the another end portion of the coil spring to the columnar portion.

12. The holder according to claim 11, wherein the columnar portion extends in the first direction and includes:

a large diameter portion with which the another end portion of the coil spring is force-fitted; and a small diameter portion having a smaller diameter than the large diameter portion, the small diameter portion being positioned closer to the one end portion of the second holder member than the large diameter portion is to the one end portion of the second holder member in the first direction.

13. The holder according to claim 1, wherein the at least one pawl is configured to be pressed, through the through-hole, in a direction away from the at least one corner part for disengagement therefrom.

14. The holder according to claim 1, wherein the first holder member is movable in the first direction relative to the second holder member.

15. The holder according to claim 1, wherein the first holder member holds the storage medium.

16. The holder according to claim 1, wherein the holder is movable relative to a housing of the cartridge.

* * * * *